UNITED STATES PATENT OFFICE 2,477,015

VULCANIZATION OF BUTADIENE ELASTOMERS

Bernard M. Sturgis, Pitman, N. J., and Joseph H. Trepagnier, Wilmington, Del., assignors to E. I. du Pont de Nemours & Company, Wilmington, Del., a corporation of Delaware No Drawing. Application September 16, 1944, Serial No. 554,534

13 Claims. (Cl. 260—79)

This invention relates to the vulcanization of butadiene elastomers, and more particularly to an improved process for vulcanizing rubber-like materials obtained by aqueous emulsion-polymerization of conjugated butadiene hydrocarbons, either alone or when modified by copolymerizing the same with copolymerizable materials. Throughout the specification and claims, the term "elastomer" is employed in its generally accepted sense to designate the rubber-like materials, as more particularly illustrated in the article by Fisher in Ind. & Eng. Chem., vol. 31, No. 8, pages 941-945, of August 1939.

It is an object of this invention to provide an improved method for vulcanizing emulsion polymers and copolymers prepared from conjugated butadiene hydrocarbons, whereby the speed of vulcanization is materially increased. It is a further object of the invention to produce vulcanized elastomers of this type having improved physical properties.

We have found that emulsion polymers (which term is used to include copolymers) prepared from conjugated butadiene hydrocarbons, and more particularly those containing over 15% of butadiene-1,3, can be vulcanized at lower temperatures and in a much shorter time than has heretofore been possible, where the vulcanization is carried out in the presence of small amounts of a meta or a para-dinitrosobenzene. While para-nitrosophenol and para-nitrosomonomethylaniline, which are capable of tautomerizing to quinone imines, have been disclosed as vulcanizing agents, these compounds are effective in the vulcanization of emulsion polymers and copolymers of butadiene hydrocarbons only at high temperatures, and, in general, give vulcanizates with relatively poor physical properties even when employed in large amounts.

The following examples are given to illustrate the invention. The parts used are by weight unless otherwise specified.

EXAMPLE 1

To illustrate the effectiveness of the dinitrosobenzenes compared to the nitroso compounds of U. S. P. 2,170,191, the following stocks were prepared.

| | A | B | C |
|---|---|---|---|
| Butadiene-Styrene Copolymer [1] | 100 | 100 | 100 |
| Channel Black | 50 | 50 | 50 |
| p-Nitrosophenol | 5 | 5 | |
| Lead Chromate | | 20 | |
| p-Dinitrosobenzene | | | 1 |

[1] Prepared by emulsion polymerization of 75 parts of butadiene-1,3 and 25 parts of styrene.

Portions of the stocks were cured in the form of small rings and tested with the Williams tensile testing machine. [Williams and Sturgis, Industrial and Engineering Chemistry 31, 1303 (1939).] The results appear in Table I.

Table I

| Min. Cure | Temp. of Cure, °F. | Stock A | Stock B | Stock C |
|---|---|---|---|---|
| STRESS AT 300% ELONGATION, LBS./SQ. IN. | | | | |
| 15 | 227 | no cure | no cure | 325 |
| 15 | 287 | very weak cure | 250 | 600 |
| 45 | 287 | 325 | 425 | 950 |
| TENSILE AT BREAK, LBS./SQ. IN. | | | | |
| 15 | 227 | No cure | No cure | 1,150 |
| 15 | 287 | Very weak cure | 625 | 1,800 |
| 45 | 287 | 825 | 1,150 | 2,150 |

It can be seen from these tests that the dinitrosobenzene, in contrast to p-nitrosophenol, cures the copolymer rapidly even at low temperatures, giving a desirable flat cure. In addition, it is effective in considerably smaller quantities. These advantages make our dinitrosobenzene useful in certain technical applications where the nitroso compounds of U. S. P. 2,170,191 are of no value.

In addition to the rapid rate of cure, another outstanding feature of our invention is the good heat aging qualities of the vulcanizates obtained with dinitrosobenzene. Butadiene emulsion copolymer vulcanizates, obtained by the action of sulfur, have relatively poor heat aging properties. When subjected to high temperatures, these vulcanizates become harder; the moduli increase and the elongations at break decrease. These effects are particularly deleterious in articles such as tires, which heat up in operation. The increased modulus and decreased elongation at break make the article less able to withstand sudden shocks and is an important cause of failure. Vulcanizates obtained with dinitrosobenzene show marked improvement in heat aging properties over vulcanizates obtained by sulfur vulcanization. Typical results illustrating this effect in two types of butadiene copolymers are shown in Example 2.

EXAMPLE 2

The following stocks were compounded and vulcanized for 30 minutes at 287° F. and tested before and after aging for 4 days in a 100° C. oven.

|  | D | E | F | G |
|---|---|---|---|---|
| Butadiene-Styrene Copolymer [1] | 100 | 100 | --- | --- |
| Butadiene-Acrylonitrile Copolymer [2] | --- | --- | 100 | 100 |
| Channel Black | 50 | 50 | 50 | 50 |
| Zinc Oxide | 5 | 5 | 5 | 5 |
| Sulfur | 2 | --- | 0.75 | --- |
| 2-mercaptobenzothiazole | 1.5 | --- | 1 | --- |
| p-Dinitrosobenzene | --- | 1 | --- | 0.4 |

[1] Prepared by the emulsion-polymerization of 75 parts of butadiene-1,3 and 25 parts of styrene.
[2] Prepared by the emulsion-polymerization of 60 parts of butadiene-1,3 and 40 parts of acrylonitrile.

Table II

| Stock | Stress at 300% Elongation, p. s. i. | | Tensile Strength at Break, p. s. i. | | Per Cent Elongation at Break | | Per cent Retention of Elongation, after Aging |
|---|---|---|---|---|---|---|---|
|  | Original | After Aging | Original | After Aging | Original | After Aging |  |
| D | 225 | 2,000 | 850 | 2,100 | 800 | 320 | 40 |
| E | 900 | 2,000 | 2,225 | 2,000 | 520 | 300 | 58 |
| F | 1,675 | --- | 3,675 | 2,550 | 460 | 150 | 33 |
| G | 1,500 | --- | 3,550 | 3,500 | 520 | 230 | 44 |

The resistance to heat aging of butadiene copolymer vulcanizates is most reliably determined by measuring the increase in modulus and decrease in elongation of the vulcanizate. When the data of Table II are examined, it is seen that the vulcanizates of the copolymers obtained with p-dinitrosobenzene retain their original elongation and modulus after aging considerably better than the corresponding vulcanizates obtained with sulfur and an accelerator.

EXAMPLE 3

Additional examples of the vulcanizing action of p-dinitroso-benzene in other butadiene hydrocarbon polymers and copolymers are given in Table III.

|  | H | I | J | K |
|---|---|---|---|---|
| Isoprene Polymer [1] | 100 | --- | --- | --- |
| Butadiene-Isoprene Copolymer [2] | --- | 100 | --- | --- |
| Isoprene-Chlorobutadiene Copolymer [3] | --- | --- | 100 | --- |
| Butadiene-Methylmethacrylate Copolymer [4] | --- | --- | --- | 100 |
| Channel Black | 50 | 50 | 40 | 50 |
| Zinc Oxide | --- | --- | 5 | --- |
| Phenyl-alpha-Naphthylamine | --- | --- | 2 | --- |
| Stearic Acid | --- | --- | 1 | --- |
| p-Dinitrosobenzene | 1 | 1 | 0.375 | 0.75 |

[1] Prepared by the emulsion polymerization of isoprene.
[2] Prepared by the emulsion polymerization of 80 parts of butadiene and 20 parts of isoprene.
[3] Prepared by the emulsion polymerization of 20 parts of isoprene and 80 parts of 2-chlorobutadiene-1,3.
[4] Prepared by the emulsion polymerization of 40 parts of butadiene-1,3 and 60 parts of methylmethacrylate.

Table III

| Stock | Min. Cure | Temp. of Cure, °F. | Stress at 300% Elongation, p. s. i. | Tensile Strength at Break, p. s. i. |
|---|---|---|---|---|
| H | 30 | 307 | 1,000 | 1,000 |
| I | 30 | 307 | 800 | 900 |
| J | 30 | 287 | 1,700 | 2,330 |
| K | 30 | 307 | 2,000 | 2,275 | m-Dinitrosobenzenes behave similar to p-dinitrosobenzenes in the vulcanization of butadiene hydrocarbon polymers and copolymers. "o-Dinitrosobenzene" has been shown to be benzofurazan oxide (see Hammick, Edwardes and Steiner, Journal of the Chemical Society 1931, page 3308) and is not active.

EXAMPLE 4

The vulcanizing action of a meta-dinitrosobenzene and a methyl substituted para-dinitrosobenzene, in contrast with the inactivity of "ortho-dinitrosobenzene," is illustrated in the following table. The stocks were cured for 30 minutes at 307° F.

Table IV

| Butadiene-Styrene Copolymer [1] | 100 | 100 | 100 |
|---|---|---|---|
| Channel Black | 50 | 50 | 50 |
| meta-Dinitrosobenzene | 0.5 | --- | --- |
| 2-methyl-1,4-Dinitrosobenzene | --- | 0.5 | --- |
| "ortho-Dinitrosobenzene" (Benzofurazan Oxide) | --- | --- | 1 |
| Stress at 300% Elongation, p. s. i. | 1,300 | 650 | ([2]) |
| Tensile Strength at Break, p. s. i. | 1,600 | 1,400 |  |
| Elongation at Break, p. s. i. | 340 | 480 |  |

[1] Prepared by the emulsion-polymerization of 75 parts of butadiene-1,3 and 25 parts of styrene.
[2] No cure.

Although the dinitrosobenzenes alone are effective vulcanizing agents for the polymers, it is sometimes advantageous to use them in conjunction with activators. These activators increase the modulus of the vulcanizates so that smaller amounts of the dinitrosobenzene are required to produce a given state of cure. The activator also increases the tensile strength in many instances.

Mild oxidizing agents such as red lead, lead dioxide, zinc peroxide, lead chromate and N-nitrosodiphenylamine are one class of compounds which are often effective activators for dinitrosobenzenes. The action of one of these, red lead oxide, is shown in Example 5.

EXAMPLE 5

The following stocks were compounded and vulcanized for 30 minutes at 307° F., then tested as before.

|  | L | M | N | O | P | Q |
|---|---|---|---|---|---|---|
| Butadiene-Styrene Copolymer [1] | 100 | 100 | --- | --- | --- | --- |
| Butadiene-Acrylonitrile Copolymer [2] | --- | --- | 100 | 100 | --- | --- |
| Butadiene-Styrene-Dimethyl-Vinyl-Ethynyl Carbinol Copolymer [2] | --- | --- | --- | --- | 100 | 100 |
| Channel Black | 50 | 50 | 50 | 50 | --- | --- |
| Semi-Reinforcing Furnace Black | --- | --- | --- | --- | 30 | 30 |
| p-Dinitrosobenzene | 0.75 | 0.75 | 0.5 | 0.5 | 0.75 | 0.75 |
| Red Lead | --- | 5 | --- | 2.5 | --- | 5 |

[1] Prepared by the emulsion-polymerization of 75 parts butadiene-1,3 and 25 parts of styrene (Note: This sample of copolymer is different from that used in Ex. 1 and cures faster).
[2] Prepared by the emulsion-polymerization of 60 parts butadiene-1,3 and 40 parts acrylonitrile.
[3] Prepared by the emulsion-polymerization of 75 parts of butadiene-1,3, 20 parts of styrene and 5 parts of dimethyl-vinylethynyl carbinol.

Table V

| Stock | Stress at 300% Elongation, p. s. i. | Tensile Strength at Break, p. s. i. | Per Cent Elongation at Break |
|---|---|---|---|
| L | 1,150 | 1,815 | 400 |
| M | 1,800 | 2,700 | 390 |
| N | 2,400 | 3,600 | 370 |
| O | 3,000 | 3,425 | 320 |
| P | 400 | 1,325 | 600 |
| Q | 550 | 1,600 | 650 |

EXAMPLE 6

Sulfur is also often an effective activator for vulcanization with dinitrosobenzenes. Its effect in two types of copolymers is shown in Table VI.

|  | R | S | T | U |
|---|---|---|---|---|
| Butadiene-Styrene Copolymer [1] | 100 | 100 | | |
| Butadiene-Acrylonitrile Copolymer [2] | | | 100 | 100 |
| Channel Black | 50 | 50 | 50 | 50 |
| Zinc Oxide | | | 5 | 5 |
| p-Dinitrosobenzene | 0.5 | 0.5 | 0.5 | 0.5 |
| Sulfur | | 2 | | 2 |

[1] Prepared by the emulsion-polymerization of 75 parts of butadiene-1,3 and 25 parts of styrene.
[2] Prepared by the emulsion-polymerization of 75 parts of butadiene-1,3 and 25 parts of acrylonitrile.

Table VI

| Stock | Stress at 300% Elongation, p. s. i. | Tensile at Break, p. s. i. |
|---|---|---|
| R | 400 | 1,150 |
| S | 550 | 1,450 |
| T | 1,500 | 2,650 |
| U | 1,850 | 3,100 |

We have found that very desirable results can be obtained by combining the use of a dinitrosobenzene with the usual accelerated sulfur vulcanization of butadiene polymers. A faster cure results, producing vulcanizates with very good physical properties. In general, these polymers vulcanize with sulfur more slowly than natural rubber. Even with many of the "ultra-accelerators" used in rubber, a relatively high temperature is required to produce a rapid cure. Where a rapid cure at relatively low temperatures is required in an elastomer such as a butadiene-styrene copolymer, the rubber industry at present resorts to the use of relatively large amounts of sulfur and accelerator. Even with this method, the vulcanization is often not rapid enough. Aside from the expense of the large amount of accelerator used, this procedure has many disadvantages. Among these are poor heat aging and profuse blooming of the stocks. Furthermore, the large amount of accelerator in the stocks causes rapid deterioration of any natural rubber in which they come into close contact. Table VII illustrates the use of a mixture of accelerator, sulfur and a dinitrosobenzene rather than a large amount of sulfur and accelerator where rapid low temperature cure is desired.

Example 7

The following compounded stocks were vulcanized for 15 minutes at 227° F.

|  | V | W | Y |
|---|---|---|---|
| Butadiene-Styrene Copolymer [1] | 100 | 100 | 100 |
| Channel Black | 50 | 50 | 50 |
| Zinc Oxide | 5 | 5 | 5 |
| Sulfur | 2 | 2 | 4 |
| Tetramethyl Thiuram Monosulfide | 1 | 1 | 3 |
| p-Dinitrosobenzene | | 1.0 | |

[1] Prepared by the emulsion polymerization of 75 parts of butadiene-1,3 and 25 parts of styrene.

Table VII

| Stock | Stress at 300% Elongation, p. s. i. | Tensile Strength at Break, p. s. i. |
|---|---|---|
| V | Very weak cure | |
| W | 800 | 2,200 |
| Y | Very weak cure | |

It is seen from Table VII that virtually no cure is obtained after 15 minutes at 227° F. by using as much as 3 parts of an active accelerator such as tetramethyl thiuram monosulfide, while a good cure can be obtained with a smaller amount of accelerator and sulfur when a dinitrosobenzene is used.

Dinitrosobenzene can also be used in combination with sulfur and an accelerator to produce vulcanizates with improved heat aging properties. Within the limits customarily used for compounding butadiene polymers, decreasing the amounts of sulfur increases the resistance of the stocks to heat aging only slightly. If the sulfur were decreased to very small amounts, one might expect to find an appreciable increase in resistance to heat aging. Unfortunately, such stocks usually cure very slowly and are not practical. Furthermore, increasing the amount of accelerator does not, in general, increase the rate of cure appreciably. However, by using small amounts of a dinitrosobenzene, fast curing, low sulfur stocks which have good heat aging properties can be produced. These advantages are illustrated in Example 8.

Example 8

The tests recorded in Tables VIII and VIII-A were carried out on the following stocks.

|  | AA | BB | CC | DD |
|---|---|---|---|---|
| Butadiene-Styrene copolymer [1] | 100 | 100 | 100 | 100 |
| Channel Black | 50 | 50 | 50 | 50 |
| Zinc Oxide | 5 | 5 | 5 | 5 |
| Sulfur | 0.5 | 0.5 | 0.5 | 1.5 |
| Mercaptobenzothiazole | 1.5 | 1.5 | 3 | 2 |
| p-Dinitrosobenzene | | 0.4 | | |

[1] Prepared by the emulsion-polymerization of 75 parts of butadiene-1,3 and 25 parts of styrene.

Table VIII

| Stock | Cure | | Stress at 300% Elongation, p. s. i. | | Tensile Strength at Break, p. s. i. | |
|---|---|---|---|---|---|---|
|  | Time, min. | Temp., °F. | Original | After Aging | Original | After Aging |
| AA | 30 | 307 | 175 | 850 | 350 | 1,775 |
|  | 60 | 307 | 225 | 1,050 | 475 | 2,075 |
| BB | 60 | 227 | 175 | | 500 | |
|  | 30 | 307 | 475 | 2,025 | 1,900 | 2,550 |
|  | 60 | 307 | 575 | 1,675 | 2,250 | 2,275 |
| CC | 30 | 307 | 200 | 1,425 | 850 | 2,150 |
|  | 60 | 307 | 250 | 1,275 | 1,325 | 2,500 |
| DD | 30 | 307 | 525 | | 2,050 | 1,600 |
|  | 60 | 307 | 700 | | 2,550 | 2,050 |

Table VIII-A

| Stock | Cure | | Per Cent Elongation at Break | | Per Cent Increase in Modulus, After Aging | Per Cent Retention of Elongation, After Aging 4 days at 100° C. |
|---|---|---|---|---|---|---|
|  | Time, Min. | Temp., °F. | Original | After Aging | | |
| AA | 30 | 307 | 900 | 470 | 385 | 52 |
|  | 60 | 307 | 840 | 470 | 365 | 56 |
| BB | 60 | 227 | 900 | | | |
|  | 30 | 307 | 670 | 450 | 325 | 67 |
|  | 60 | 307 | 650 | 470 | 190 | 72 |
| CC | 30 | 307 | 950 | 400 | 610 | 42 |
|  | 60 | 307 | 850 | 470 | 410 | 55 |
| DD | 30 | 307 | 680 | 200 | 480 | 29 |
|  | 60 | 307 | 640 | 240 | 330 | 38 |

Although it can be seen from Tables VIII and VIII-A that stocks AA and CC are not practical, being undercured even after 60 minutes at 307° F., they are still inferior to stock BB in heat aging properties. When the sulfur and accelerator are increased, as in stock DD, to give a stock which is comparable in rate of cure to that of stock BB, the superiority in resistance to heat aging of the stock containing the dinitroso compound is very striking.

It should be noticed that stock BB is not very scorchy, giving only a slight cure after 60 minutes at 227° F. This is one of the outstanding advantages of using a dinitrosobenzene with sulfur and an accelerator. It thus becomes possible to produce stocks which cure rapidly at normal curing temperatures but which are not scorchy and yet give vulcanizates with good heat aging properties.

EXAMPLE 9

Dinitrosobenzenes will activate the sulfur vulcanization of butadiene polymers with all types of vulcanization accelerators. The data of Table IX illustrates the wide variety of accelerators which can be used. The base stock used in these tests had the following composition:

Base Stock

| | |
|---|---|
| Butadiene-styrene copolymer [1] | 100 |
| Channel black | 50 |
| Zinc oxide | 5 |
| Sulfur | 2 |

[1] Prepared by the emulsion-polymerization of 75 parts of butadiene-1,3 and 25 parts of styrene.

The accelerators and p-dinitrosobenzene shown in the table were added to this base stock prior to vulcanization. The stocks were cured for 30 minutes at 287° F.

Table IX

| Acceleration Used with Base Stock | Stress at 300% Elongation, Lbs./Sq. In. | Tensile at Break, Lbs./Sq. In. |
|---|---|---|
| 2-Mercaptothiazoline 1.0 | 275 | 675 |
| 2-Mercaptothiazoline 1.0<br>p-Dinitrosobenzene 0.3 | 900 | 2,400 |
| Benzthiazyl-cyclohexyl-sulfeneamide 1.0 | 525 | 1,525 |
| Benzthiazyl-cyclohexyl-sulfeneamide 1.0<br>p-Dinitrosobenzene 0.3 | 1,300 | 2,450 |
| Tetramethylthiuram Disulfide 0.3 | 1,025 | 2,625 |
| Tetramethylthiuram Disulfide 0.3<br>p-Dinitrosobenzene 0.3 | 1,425 | 2,925 |
| Piperidinium pentamethylene-dithiocarbamate 0.3 | 275 | 850 |
| Piperidinium pentamethylene-dithiocarbamate 0.3<br>p-Dinitrosobenzene 0.3 | 350 | 1,025 |
| Zinc diethyldithiocarbamate 0.3 | 550 | 1,600 |
| Zinc diethyldithiocarbamate 0.3<br>p-Dinitrosobenzene 0.3 | 825 | 2,125 |
| Mercaptobenzothiazole 0.5<br>Diphenylguanidine 0.5 | 350 | 1,000 |
| Mercaptobenzothiazole 0.5<br>Diphenylguanidine 0.5<br>p-Dinitrosobenzene 0.3 | 875 | 2,125 |
| Tetramethylammonium Formate 1.0 | 375 | 1,275 |
| Tetramethylammonium Formate 1.0<br>p-Dinitrosobenzene 0.3 | 850 | 2,275 |
| Butyraldehyde-aniline Condensation Product 1.0 | 150 | 275 |
| Butyraldehyde-aniline Condensation Product 1.0<br>p-Dinitrosobenzene 0.3 | 350 | 950 |
| Tetraethylenepentamine 1.0 | 325 | 875 |
| Tetraethylenepentamine 1.0<br>p-Dinitrosobenzene 0.3 | 450 | 1,450 |

EXAMPLE 10

Table X illustrates the effect of a dinitrosobenzene on the sulfur vulcanization of other types of butadiene copolymers. These stocks were cured for 30 minutes at 307° F.

| | EE | FF | GG | HH | II |
|---|---|---|---|---|---|
| Butadiene-Acrylonitrile Copolymer [1] | 100 | 100 | 100 | | |
| Butadiene-Ethyl Methacrylate-Isobutylene Copolymer [2] | | | | 100 | 100 |
| Channel Black | 50 | 50 | 50 | 50 | 50 |
| Zinc Oxide | 5 | 5 | 5 | 5 | 5 |
| Sulfur | 0.75 | 0.75 | 0.75 | 2 | 2 |
| Mercaptobenzothiazole | 1 | 1 | 1 | 1.5 | 1.5 |
| p-Dinitrosobenzene | | 0.1 | 0.3 | | 1 |

[1] Prepared by emulsion polymerization of 60 parts of butadiene-1,3 and 40 parts acrylonitrile.
[2] Prepared by emulsion polymerization of 15 parts of butadiene-1,3, 35 parts of ethyl methacrylate and 50 parts of isobutylene.

Table X

| Stock | Stress at 300% Elongation, p. s. i. | Tensile Strength at Break, p. s. i. | Per Cent Elongation at Break |
|---|---|---|---|
| EE | 2,100 | 3,150 | 380 |
| FF | 2,550 | 4,275 | 390 |
| GG | 2,900 | 4,500 | 380 |
| HH | | 425 | 180 |
| II | | 1,050 | 160 |

Our invention can be applied very advantageously to cements prepared from butadiene hydrocarbon copolymers. As previously pointed out, the copolymers vulcanize with sulfur more slowly than natural rubber so that even with "ultra-accelerators" it is very difficult to produce a cement which cures rapidly at low temperatures. Such "self-curing" cements are often used in industry. By using a dintrosobenzene, either alone or in combination with an oxidizing agent or in combination with sulfur and an accelerator, butadiene copolymer cements can be produced which cure at room temperature.

EXAMPLE 11

To illustrate this use in cements, 0.5 part (based on the copolymer) of p-dinitrosobenzene was added to a 12.5% cement of a butadiene-styrene copolymer (prepared by the emulsion polymerization of 75 parts butadiene, 25 parts styrene) in xylene. The mixture was agitated for a day and a film cast from the cement. The resultant film was "snappy," had low permanent set, crumbled when milled and had other evidence of vulcanization. The film obtained from a cement treated similarly but containing no p-dinitrosobenzene showed no evidence of vulcanization and formed a smooth sheet when milled.

Dinitrosobenzenes can also be used in the compounding of butadiene copolymer latices. Here, too, the rapid rate of cure is a great advantage. The rapid expansion of the use of natural rubber latex is based in no small part on the existence of "ultra-accelerators" which will vulcanize the product below the boiling point of water. Our dinitrosobenzenes accomplish this end readily. This can be illustrated by the following example.

EXAMPLE 12

A film of a butadiene-styrene copolymer was formed by immersing a porous cup in a 25% latex (prepared by the emulsion-polymerization of 75 parts of butadiene and 25 parts of styrene) to which 1 part (based on the solids content of the latex) of p-dinitrosobenzene (as a 25% dispersion) had been added and applying vacuum to the cup. The film was dried for two days at room temperature and then for one day at 50° C.

When stripped from the cup, the film was obviously vulcanized. It had a fairly high tensile strength, low permanent set and crumbled on a mill. A control film which did not contain p-dinitrosobenzene, but which was prepared and treated as described above, showed no evidence of vulcanization. It was soft and plastic and could be readily milled.

The meta- and para-nitrosobenzenes which may be employed in carrying out the process of this invention are those which have the general formula:

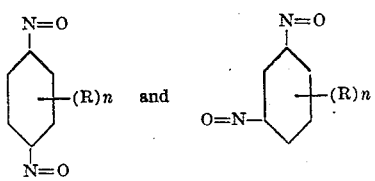

wherein R may be alkyl, cycloalkyl, aralkyl, alkoxy or halogen and n is 0 to 3. Straight aliphatic derivatives of the compounds of the above formula may be those containing either the lower or higher alkyl chains, such as those up to 20 carbon atoms. The cycloalkyl derivatives are preferably those which contain only one ring such as the cyclohexyl and the simpler terpenes, such as pinene, etc. In the aralkyl groups, the alkyl chain is preferably not more than 10 carbon atoms in length, and the aryl group attached thereto is of the benzene or naphthalene series. The alkoxy groups are preferably those which contain less than 10 carbon atoms. The halogens may include fluorine, chlorine and bromine. The simpler substituted derivatives of this class include such compounds as 2-methyl-1,4-dinitrosobenzene, 2-fluoro-1,4-dintrosobenzene, 5-methoxy-1,3-dintrosobenzene, 2 - methyl-5-isopropyl-1,4-dinitrosobenzene, 5 - chloro-1,3-dinitrosobenzene, 2-benzyl-1,4-dinitrosobenzene and 2-cyclohexyl-1,4-dinitrosobenzene.

The para-dinitrosobenzenes can be prepared by the method of Ruggli and Petitjean [Hevetica Chimica Acta 21, page 723 (1938)]. The meta-dinitrosobenzenes can be prepared by the method of Alway and Gortner, Berichte 38, page 1899 (1905).

The amount of dinitroso compound used in carrying out this invention may vary over a wide range, and will depend on the properties desired in the vulcanizate as well as the nature of the copolymer. Our preferred range is, however, from 0.1 to 3 parts of dinitroso compound for 100 parts of elastomer.

The polymers to which the present invention is particularly applicable are those prepared by emulsion-polymerization of butadiene hydrocarbons such as butadiene-1,3 and isoprene, or by emulsion-copolymerization of these materials with polymerizable compounds containing the group $H_2C=C<$, such as styrene, acrylic nitrile, methacrylic nitrile, vinylidene chloride, methyl vinyl ketone, dialkyl vinylethynyl carbinols, the acrylic and methacrylic esters, chloroprene, etc., all of which are known to produce rubber-like materials when copolymerized with butadiene and isoprene. While the amount of the butadiene hydrocarbon used in conjunction with the copolymerized materials to produce rubber-like products is usually above 50% of the total weight of the monomers, the invention is also applicable to those synthetic rubber-like butadiene elastomers which contain as little as 15% of the butadiene-1,3 or other butadiene hydrocarbon.

Among the preferred vulcanization accelerators which may be used are the mercapto thiazoles and thiazolines and their derivatives, and the thiuram sulfides. By the term "vulcanization accelerator," we refer to those reagents used to accelerate the vulcanization of rubber by means of sulfur.

The invention is of course applicable to stocks containing the usual fillers, extenders, softeners and other compounding ingredients usually employed in the trade.

The invention provides a means for vulcanizing butadiene hydrocarbon polymers (including copolymers) rapidly even at low temperatures, producing vulcanizates which have excellent heat aging properties. It also provides a method for improving the rate of vulcanization of these polymers by sulfur as well as a means of producing sulfur containing vulcanizates which have improved heat aging properties.

We claim:

1. The process of vulcanizing butadiene elastomers which are produced by emulsion-polymerization of polymerizable materials comprising at least 50% of a butadiene-1,3 hydrocarbon, which comprises incorporating in said elastomer from 0.3 to 3 parts, per 100 parts of elastomer, of a dinitroso compound of the class consisting of meta- and para-dinitrosobenzenes of the formula:

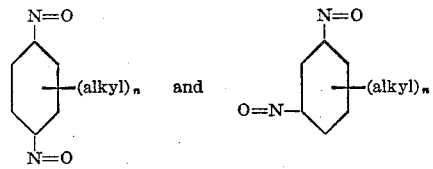

wherein the alkyl groups contain up to 20 carbon atoms and $n$ stands for a numeral from 0 to 3, and subjecting the elastomer to vulcanizing conditions.

2. The process of vulcanizing butadiene elastomers which are produced by emulsion-polymerization of polymerizable materials comprising at least 50% of a butadiene-1,3 hydrocarbon, which comprises incorporating in said elastomer sulfur and from 0.3 to 3 parts, per 100 parts of elastomer, of a dinitroso compound of the class consisting of meta- and para-dinitrosobenzenes of the formula:

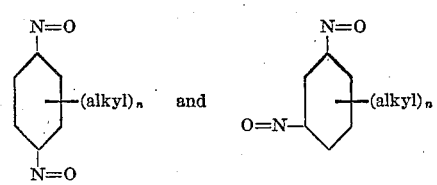

wherein the alkyl groups contain up to 20 carbon atoms and $n$ stands for a numeral from 0 to 3, and subjecting the elastomer to vulcanizing conditions.

3. The process of vulcanizing butadiene elastomers which are produced by emulsion-polymerization of polymerizable materials comprising at least 50% of a butadiene-1,3 hydrocarbon, which comprises incorporating in said elastomer sulfur, a vulcanization accelerator and from 0.3 to 3 parts, per 100 parts of elastomers, of a dinitroso compound of the class consisting of meta- and para-dinitrosobenzenes of the formula:

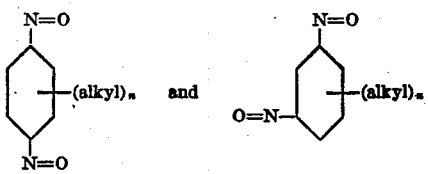

wherein the alkyl groups contain up to 20 carbon atoms and $n$ stands for a numeral from 0 to 3, and subjecting the elastomer to vulcanizing conditions.

4. The process of vulcanizing butadiene elastomers which are produced by emulsion-polymerization of a mixture of butadiene-1,3 and styrene and in which the butadiene comprises at least 50% of the elastomer, which comprises incorporating in said elastomer from 0.3 to 3 parts, per 100 parts of elastomer, of a dinitroso compound of the class consisting of meta- and para-dinitrosobenzenes of the formula:

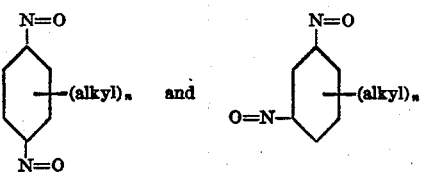

wherein the alkyl groups contain up to 20 carbon atoms and $n$ stands for a numeral from 0 to 3, and subjecting the elastomer to vulcanizing conditions.

5. The process of vulcanizing butadiene elastomers which are produced by emulsion-polymerization of a mixture of butadiene-1,3 and styrene and in which the butadiene comprises at least 50% of the elastomer, which comprises incorporating in said elastomer sulfur and from 0.3 to 3 parts, per 100 parts of elastomers, of a dinitroso compound of the class consisting of meta- and para-dinitrosobenzenes of the formula:

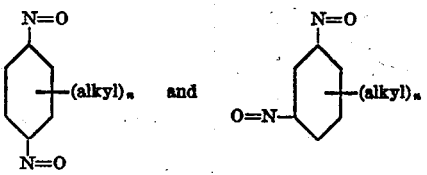

wherein the alkyl groups contain up to 20 carbon atoms and $n$ stands for a numeral from 0 to 3, and subjecting the elastomer to vulcanizing conditions.

6. The process of vulcanizing butadiene elastomers which are produced by emulsion-polymerization of a mixture of butadiene-1,3 and styrene and in which the butadiene comprises at least 50% of the elastomer, which comprises incorporating in said elastomer sulfur, a vulcanization accelerator and from 0.3 to 3 parts, per 100 parts of elastomer, of a dinitroso compound of the class consisting of meta- and para-dinitrosobenzenes of the formula:

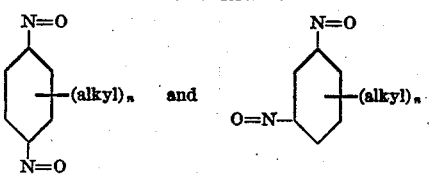

wherein the alkyl groups contain up to 20 carbon atoms and $n$ stands for a numeral from 0 to 3, and subjecting the elastomer to vulcanizing conditions.

7. The process of vulcanizing butadiene elastomers which are produced by emulsion-copolymerization of about 75 parts of butadiene-1,3 and about 25 parts of styrene, which comprises incorporating in said elastomer from 0.3 to 3 parts of a dinitroso compound of the class consisting of meta- and para-dinitrosobenzenes of the formula:

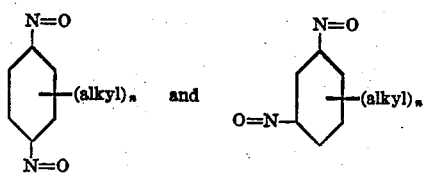

wherein the alkyl groups contain up to 20 carbon atoms and $n$ stands for a numeral from 0 to 3, and subjecting the elastomer to vulcanizing conditions.

8. The process of vulcanizing butadiene elastomers which are produced by emulsion-copolymerization of about 75 parts of butadiene-1,3 and about 25 parts of styrene, which comprises incorporating in said elastomer sulfur and from 0.3 to 3 parts of a dinitroso compound of the class consisting of meta- and para-dinitrosobenzenes of the formula:

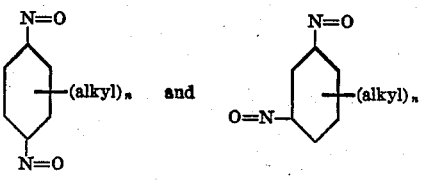

wherein the alkyl groups contain up to 20 carbon atoms and $n$ stands for a numeral from 0 to 3, and subjecting the elastomer to vulcanizing conditions.

9. The process of vulcanizing butadiene elastomers which are produced by emulsion-copolymerization of about 75 parts of butadiene-1,3 and about 25 parts of styrene, which comprises incorporating in said elastomer sulfur, a vulcanization accelerator and from 0.3 to 3 parts of a dinitroso compound of the class consisting of meta- and para-dinitrosobenzenes of the formula:

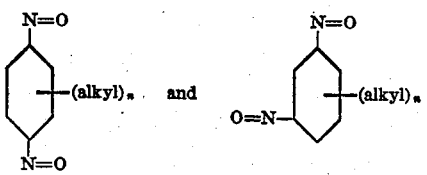

wherein the alkyl groups contain up to 20 carbon atoms and $n$ stands for a numeral from 0 to 3, and subjecting the elastomer to vulcanizing conditions.

10. The process of vulcanizing butadiene elastomers which are produced by emulsion-polymerization of polymerizable materials comprising at least 50% of a butadiene-1,3 hydrocarbon, which comprises incorporating in said elastomer from 0.3 to 3 parts, per 100 parts of elastomer, of para-dinitrosobenzene, and subjecting the elastomer to vulcanizing conditions.

11. The process of vulcanizing butadiene elastomers which are produced by emulsion-polymerization of polymerizable materials comprising at least 50% of a butadiene-1,3 hydrocarbon, which comprises incorporating in said elastomer sulfur and from 0.3 to 3 parts, per 100 parts of elastomer, of para-dinitrosobenzene, and subjecting the elastomer to vulcanizing conditions.

12. The process of vulcanizing butadiene elastomers which are produced by emulsion-polymerization of a mixture of butadiene-1,3 and styrene and in which the butadiene comprises at least 50% of the elastomer, which comprises incorporating in said elastomer sulfur, a vulcanization accelerator and from 0.3 to 3 parts, per 100 parts of elastomer, of para-dinitrosobenzene, and subjecting the elastomer to vulcanizing conditions.

13. The process of vulcanizing butadiene elastomers which are produced by emulsion-copolymerization of about 75 parts of butadiene-1,3 and about 25 parts of styrene, which comprises incorporating in said elastomer sulfur, a vulcanization accelerator and from 0.3 to 3 parts of para-dinitrosobenzene, and subjecting the elastomer to vulcanizing conditions.

BERNARD M. STURGIS.
JOSEPH H. TREPAGNIER.

REFERENCES CITED

The following references are of record in the file of this patent:

UNITED STATES PATENTS

| Number | Name | Date |
| --- | --- | --- |
| 2,170,191 | Fisher | Aug. 22, 1939 |
| 2,393,321 | Haworth | Jan. 22, 1946 |

OTHER REFERENCES

Pages 500 to 506, Industrial and Engineering Chemistry, vol. 38, May 1946.

Page 628, Beilstein's Handbuch der Organische Chemie, 4th edition, vol. 7, 1925.